Patented Feb. 6, 1951

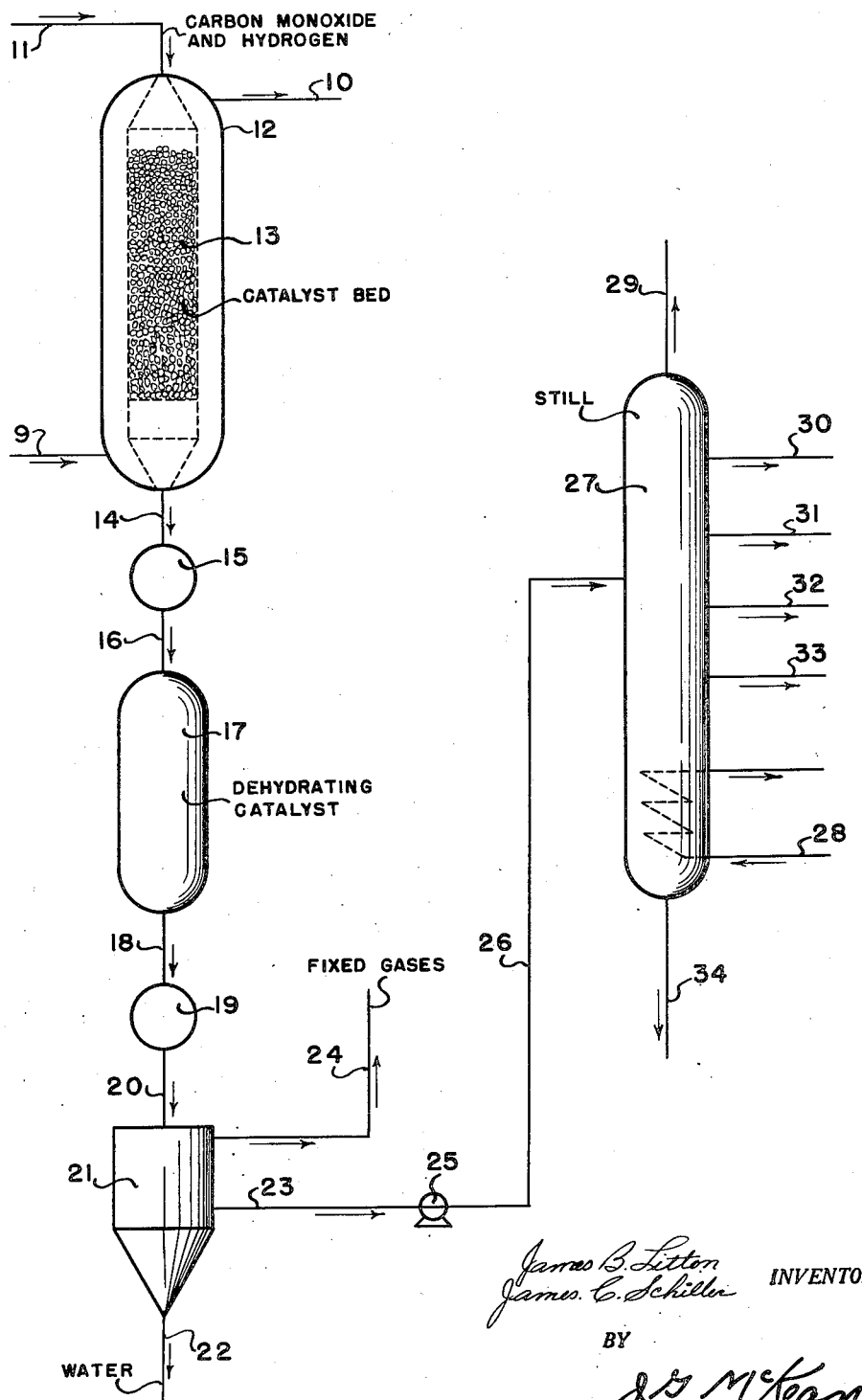

2,540,587

UNITED STATES PATENT OFFICE 2,540,587

PROCESS FOR PRODUCING HYDRO-
CARBONS

James B. Litton, Houston, and James C. Schiller,
Baytown, Tex., assignors to Standard Oil De-
velopment Company, a corporation of Delaware Application February 7, 1946, Serial No. 646,031

1 Claim. (Cl. 260—450)

This invention relates to an improved method for effecting the synthesis of hydrocarbons from carbon monoxide and hydrogen. More particularly, this invention relates to a process for suppressing the production of oxygenated carbon compounds during the catalytic conversion of carbon monoxide and hydrogen to hydrocarbons.

It is well known to the art to produce hydrocarbons by the reaction of carbon monoxide and hydrogen in the presence of a suitable catalyst and under the well defined conditions of temperature, pressure, and contact time specifically required for the particular type of catalyst being employed. The products obtained by the reaction of carbon monoxide and hydrogen also vary in type, configuration, and molecular weight depending upon the particular catalyst being employed. Paraffinic and olefinic hydrocarbons are the usual products obtained in a reaction of this type; by-products consist chiefly of water, oxygenated compounds, and carbon dioxide. Experience has shown that the oxygenated compounds are predominantly alcoholic in nature and that small amounts of ethers, organic acids, and ketones are usually formed. In some cases, it has been observed that the concentration of alcohols in the liquid products obtained by the hydrogenation of carbon monoxide may be as high as 20 volume per cent. The presence of alcohols in the liquid product is sometimes objectionable. It is known, for example, that alcohols have lower heat contents per unit weight than do the corresponding mono-olefins produced by dehydration of the alcohols. If the products of the synthesis reaction are to be used as fuels, it is desirable that the material have as high a heat content per unit weight as is possible in order to decrease the amount of fuel required for long operations. Alcohols also are known to have lower A. S. T. M. Research octane ratings than the corresponding mono-olefins from which the alcohols are derived and, consequently, are not desirable components of high octane motor fuels.

The removal of alcohols from mixtures of hydrocarbons and alcohols is an extremely difficult and expensive operation. Separation by distillation alone cannot be effected economically because of the proximity of the boiling points of the alcohols and the hydrocarbons. A complex mixture of the type obtained by the reaction of carbon monoxide and hydrogen does not lend itself easily to extractive or azeotropic distillation procedures for separating the alcohols from the hydrocarbons. Solvent extraction of the alcohols from hydrocarbons is not easily accomplished in the case of the high molecular weight compounds. It would be desirable, therefore, to effect the production of hydrocarbons essentially free of alcohols by means other than those discussed above.

It is the primary object of this invention to reduce the alcohol content of the product obtained in the synthesis process in which carbon monoxide is catalytically hydrogenated.

A further object of this invention is to convert alcohols formed during the reaction of carbon monoxide and hydrogen to water and to mono-olefins having higher heat contents and higher octane ratings than the alcohols.

In essence, we propose to synthesize hydrocarbons essentially free of alcohols by passing carbon monoxide over a suitable catalyst and under well defined conditions of temperature, pressure, and contact time and, simultaneously or immediately following said synthesis reaction, contacting the reaction products with a dehydrating catalyst under such conditions that the alcohols formed during the synthesis reaction are converted to the corresponding olefinic hydrocarbons and water. We propose to employ a dehydrating catalyst in a separate reaction zone or admixed with the synthesis catalyst in such a manner that alcohols formed during the synthesis reaction are converted to hydrocarbons and water and the liquid reaction product thus obtained consists chiefly of paraffinic, olefinic and other types of hydrocarbons. The dehydrating catalyst employed is preferably one that will, under suitable temperature and pressure conditions, convert the alcohols admixed with the hydrocarbons to the corresponding olefinic-type hydrocarbons without at the same time altering the structure of the original hydrocarbons produced in the synthesis operation.

Our invention may be more readily understood by referring to the single figure which is a flow diagram showing a method of practicing the present invention. Carbon monoxide and hydrogen prepared by means well known to the art pass through line 11, at the pressure desired in the subsequent synthesis reaction, into reactor 12 containing catalyst mass 13 wherein the carbon monoxide and hydrogen are converted to hydrocarbons, oxygenated compounds consisting chiefly of alcohols, water, and minor portions of carbon dioxide. Since the reaction of carbon monoxide and hydrogen is exothermic, it is necessary that reactor 12 be so constructed that the tremendous amounts of heat evolved during the reaction may be removed from the catalyst bed 13. The removal of heat from catalyst bed 13 must be carefully controlled so that the temperature in the catalyst bed can be maintained within the narrow limits required for the catalyst to reach its maximum activity. Reactor 12 may be constructed according to any of those designs well known to the art in which the proper heat control is effectively maintained. In the drawing a space is shown between the shell of the reactor 12 and catalyst bed 13, with inlet and outlet lines 9 and 10, respectively, for supplying and withdrawing a suitable fluid to the space for controlling the temperature of the catalyst bed.

The effluent from catalyst bed 13 containing unreacted carbon monoxide and hydrogen, hydrocarbons, oxygenated compounds consisting chiefly of alcohols, carbon dioxide, and water passes through line 14, cooling or heating means 15, and line 16 to reactor 17 containing a suitable dehydrating catalyst. The temperature to which the effluent from reactor 12 is heated or cooled in means 15 may vary depending on the type of catalyst contained in reactor 17. This effluent passes through catalyst contained in reactor 17 under such conditions of temperature, pressure, and contact time that the alcohol and ether constituents contained therein are converted to water and mono-olefins. The effluent from reactor 17 passes through line 18 to cooling means 19 wherein the major portion of hydrocarbons and water are liquefied. The liquefied hydrocarbons and water pass through line 20 to settling means 21 wherein the total mixture is separated into a hydrocarbon phase and a water phase. Water is withdrawn continuously from settler 21 through line 22, and the hydrocarbon layer is withdrawn continuously from settler 21 through line 23. Non-condensible materials contained in the effluent from reactor 17 may be withdrawn from the top of settling means 21 through line 24. These gases are conducted to a separation means, not shown, in order to recover unreacted carbon monoxide and hydrogen for recycling to reactor 12.

The liquid hydrocarbon layer passing through line 23 is conducted by pump 25 and line 26 to distilling means 27. The hydrocarbons are separated into a plurality of fractions in distilling means 27, heat being supplied during the distillation by means of heating coils 28. Hydrocarbon fractions withdrawn from distilling means 27 and suitable for use as motor fuels, Diesel fuels, or components of lubricating oils are withdrawn through lines 30, 31, 32, and 33. A heavy bottoms fraction withdrawn from distilling means 27 through line 34 may be employed as a lubricating oil or as a fuel oil.

If desirable, the fractions withdrawn from distilling means 27 and boiling in the temperature range of motor fuels may be hydrogenated to improve their octane and stability characteristics. Other treating processes such as alkylation, isomerization, or aromatization may be employed to impart improved octane characteristics to the gasoline hydrocarbon fractions withdrawn from distilling means 27.

The ratio of hydrogen to carbon monoxide employed as charge to reactor 12 will vary depending on the type of catalyst employed in the reactor; however, it is usually desirable to employ hydrogen to carbon monoxide ratios varying from 1 to 1 to 2 to 1. The catalyst employed in reactor 12 for synthesizing hydrocarbons from carbon monoxide and hydrogen may be any of the types well known to the art such as the oxides of the metals occurring in group 8 of the periodic table. These include iron oxide, cobalt oxide, and nickel oxide prepared in various ways and supported, in some cases, on carriers. These catalysts are frequently promoted by oxides of the alkali metals such as potassium oxide. The conditions to be employed in reactor 12 depend upon the type of catalyst used and the ratio of hydrogen to carbon monoxide passed over the catalyst. Pressures of from atmospheric to 500 pounds per square inch gage may be used. The temperatures maintained in the catalyst bed may vary from 300° to 700° F.; however, the operating temperature for a given catalyst must be maintained within a very narrow range in order to obtain the highest possible yield of hydrocarbons from a given amount of carbon monoxide and hydrogen. The gaseous mixture of carbon monoxide and hydrogen may be passed over the catalyst at flow rates varying from 100 to 1500 volumes of gas per volume of catalyst per hour.

The dehydrating catalyst employed in reactor 17 may be any of those well known to the art effective for converting alcohols and ethers and other oxygenated organic compounds to mono-olefins and water. As specific examples, the oxides of thorium, aluminum, tungsten, or chromium may be mentioned. In some cases, it may be preferable to impregnate alumina with one or more of the other afore-mentioned oxides and to employ this material as the dehydrating catalyst. Phosphoric acid supported on a suitable carrier also may be employed. The temperatures maintained in reactor 17 for the dehydration of alcohols and ethers to mono-olefins may vary from 300° F. to temperatures as high as 800° F. Pressures employed in dehydrating means 17 may vary from atmospheric to 500 pounds per square inch gage, although low pressures are usually preferred.

In another modification of our invention the dehydrating catalyst may be placed in reactor 12 in a bed immediately below the synthesis catalyst employed to effect the reaction of carbon monoxide and hydrogen. This modification may be especially desirable in cases where the synthesis reaction conditions are approximately the same as those conditions required in the dehydrating reaction. Another modification of our invention may be that in which the synthesis catalyst and dehydrating catalyst are intimately mixed so that alcohols and ethers formed by the reaction of carbon monoxide and hydrogen are dehydrated to mono-olefins and water in the same catalyst bed. It is also possible to impregnate a suitable synthesis catalyst with a dehydrating catalyst of the type previously mentioned and to employ this mixed catalyst for carrying out both the synthesis of hydrocarbon-containing products from carbon monoxide and hydrogen and the dehydration of alcohols and ethers formed in the synthesis reaction to water and olefinic hydrocarbons. If desired, the products from the synthesis reaction may be conducted to a separating means in order to remove water and non-condensable gases from the mixture of liquid hydrocarbons and oxygenated compounds before passing the latter mixture over a dehydrating catalyst. Other modifications of our invention will be obvious to those skilled in the art.

The nature and objects of the present invention having been fully described and illustrated, what we wish to claim as new and useful and to secure by Letters Patent is:

A process for the production of normally liquid hydrocarbons substantially free from dehydratable oxygenated carbon compounds which comprises reacting carbon monoxide and hydrogen at an elevated temperature in the range between 300° and 700° F. and pressure in the range between atmospheric and 500 p. s. i. g. and in the presence of a catalyst selected from the oxides of the metals of group VIII of the periodic table to produce a mixture consisting substantially of hydrocarbons, oxygenated hydrocarbons, water and carbon dioxide, passing said mixture without condensation thereof directly through an alumina base dehydrating catalyst maintained separately from said first-named catalyst in a separate dehydrating zone under dehydrating conditions at a temperature in the range between 300° and 800° F. and at a pressure in the range from atmospheric to 500 p. s. i. g. wherein dehydratable oxygenated compounds are substantially dehydrated to water and unsaturated hydrocarbons, and separating water from the mixture substantially free of dehydratable oxygenated hydrocarbons.

JAMES B. LITTON.
JAMES C. SCHILLER.

REFERENCES CITED

The following references are of record in the file of this patent:

UNITED STATES PATENTS

| Number | Name | Date |
|---|---|---|
| 1,873,537 | Brown et al. | Aug. 23, 1932 |
| 1,979,841 | Pier et al. | Nov. 6, 1934 |
| 2,264,427 | Asbury | Dec. 2, 1941 |
| 2,324,172 | Parkhurst | July 13, 1943 |
| 2,403,524 | Hagemann | July 9, 1946 |
| 2,450,500 | Clark | Oct. 5, 1948 |

FOREIGN PATENTS

| Number | Country | Date |
|---|---|---|
| 278,353 | Great Britain | Mar. 25, 1929 |
| 735,276 | Germany | May 11, 1943 |

OTHER REFERENCES

Sabatier, Catalysis in Organic Chemistry, pub. by D. Van Nostrand Co., N. Y. (1922), page 702.